A. E. BELL.
METHOD OF COMBINING PROTRACTOR AND BEAM COMPASS IN ONE DRAFTING TOOL.
APPLICATION FILED DEC 30, 1920.
1,436,471.
Patented Nov. 21, 1922.
2 SHEETS—SHEET 2.
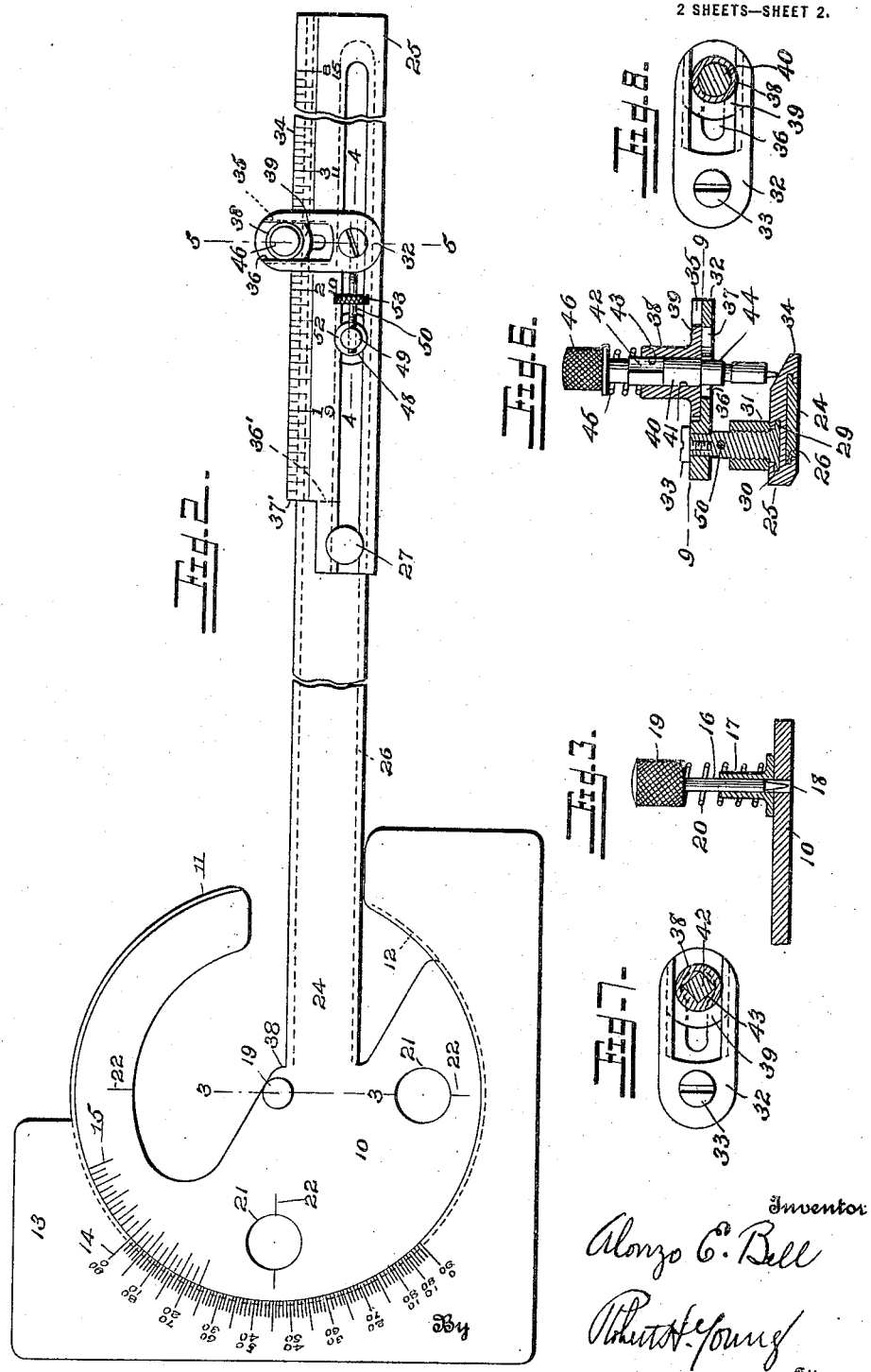

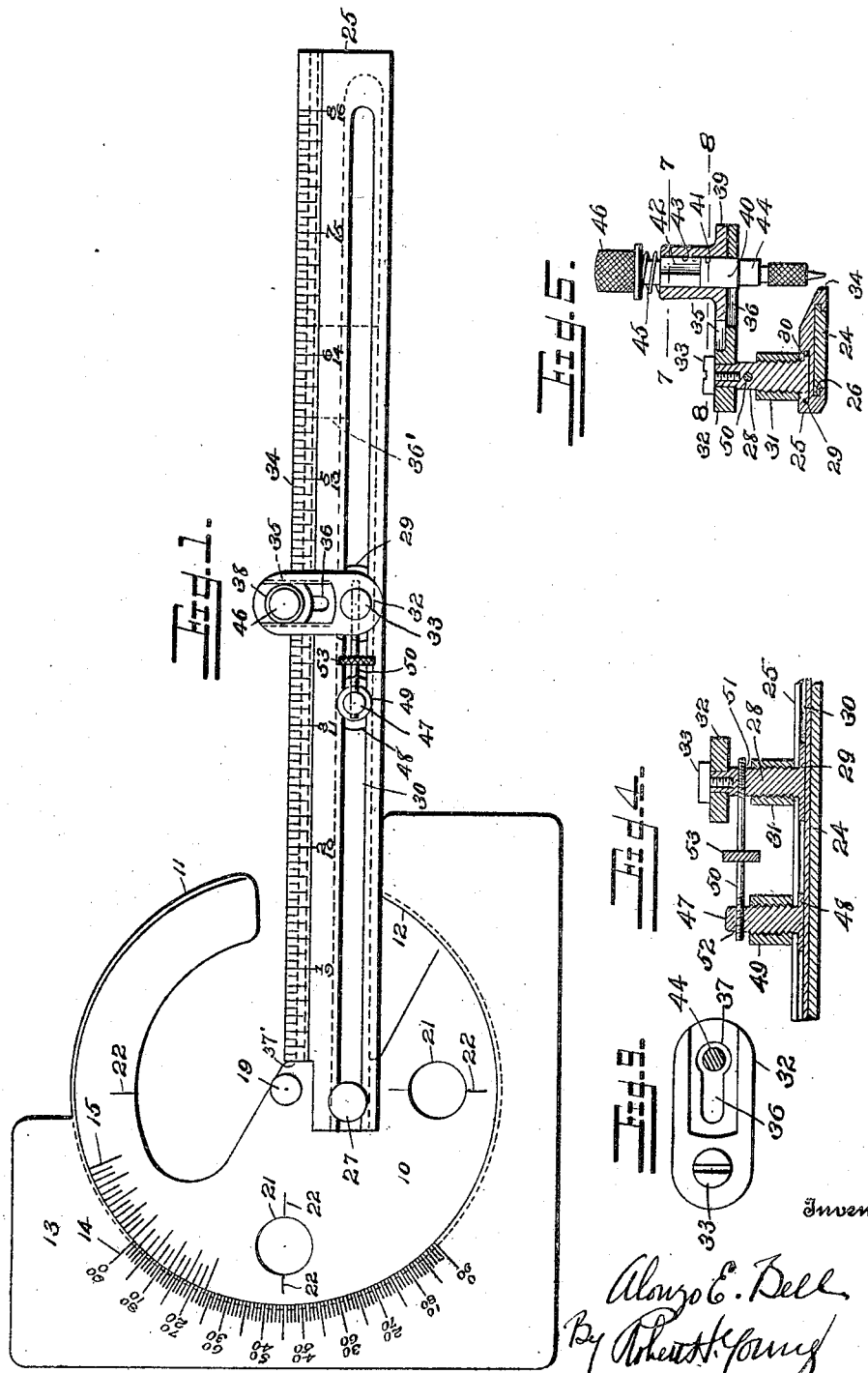

Patented Nov. 21, 1922.

1,436,471

UNITED STATES PATENT OFFICE.

ALONZO E. BELL, OF SPOKANE, WASHINGTON.

METHOD OF COMBINING PROTRACTOR AND BEAM COMPASS IN ONE DRAFTING TOOL.

Application filed December 30, 1920. Serial No. 434,123.

*To all whom it may concern:*

Be it known that I, ALONZO EDWIN BELL, a citizen of the United States, residing at Spokane, in the county of Spokane and State of Washington, have invented certain new and useful Improvements in Methods of Combining Protractor and Beam Compass in One Drafting Tool, of which the following is a specification.

My invention relates to instruments of precision and, in particular, to a combination protractor and compass for drafting purposes.

The primary object of the invention is to provide an instrument of this nature in which the protractor is capable of use in the usual manner but which has simple and effective means for converting the device into a compass when it is desired to describe a circle or an arc of a circle. The compass mechanism is of such construction that it will not interfere in any way with the use of the instrument as a protractor.

A further object is to provide an extension device for the compass part of the instrument whereby circles of large radius may be described.

An object is to provide in an instrument of the character described a protractor having a depressible pivoting point adapted normally to be supported in inoperative position clear of the paper on which the instrument is mounted in use as a protractor only but capable of being forced readily into engagement with the paper when the device is to be used as a compass.

Another object is to provide a marking element combined with the protractor and its pivoted point just described which has means connected therewith by which it may be adjusted with precision radially with respect to the pivotal axis in order to describe a circle of any predetermined radius.

A still further object is to provide adjusting means for the marking element of such construction that the marking element may first be shifted manually to effect rough adjustment and then may be given more minute adjustment.

Another object is to provide means by which the pivoting point may be shifted into accurate registration with any desired point on the drawing paper in the initial setting of the instrument without having the pivot point in view. This feature permits manufacture of the instrument in thin flat form which is most suitable to its use and also reduces the cost of manufacture.

A further object is to mount the marking element in a manner similar to the pivoting point in order that it may be maintained normally in elevated, inoperative position out of contact with the drawing paper but may be readily depressed into contact with the latter when it is desired to use the instrument as a compass.

Further objects of the invention will appear as the following description is read in connection with the accompanying drawings, in which:

Figure 1 is a plan view of the device, showing the same in use for drawing a circle of reduced radius;

Figure 2 is a similar view showing the instrument in use as a compass for drawing a circle of large radius, a portion of the arm extension being broken away;

Figure 3 is a vertical sectional view of the pivoting device taken on line 3—3 of Figure 2;

Figure 4 is a vertical sectional view of the micrometer adjusting device for the marking element, taken on line 4—4 of Figure 2;

Figure 5 is a sectional view on line 5—5 of Figure 2, showing the marker proper in its depressed operative position;

Figure 6 is a similar view showing the marker in its elevated, inoperative position after being shifted horizontally to bring the marking point into suitable proximity to the measuring scale of the arm extension for effecting micrometer adjustment of the former;

Figure 7 is a horizontal section on line 7—7 of Figure 5;

Figure 8 is a similar section on line 8—8 of Figure 5; and,

Figure 9 is a similar section on line 9—9 of Figure 6.

My inventive idea may be expressed in various ways but a convenient and practical embodiment of the same is illustrated in the annexed drawings.

The protractor which is the primary element of the instrument which I have conceived may be in the form shown in Figures 1 and 2, but I do not limit myself to the use of any particular type of protractor. In the present instance, the protractor consists of an oscillatory plate 10 of substantially circular shape which has beveled edges 11 slidably fitting within a correspondingly shaped, semi-circular groove 12 in an angular plate 13. This plate 13 is capable of being used as a triangle and as means for fixing the protractor in a definite location on a sheet of drawing paper for use in its primary function as a protractor. The relatively adjustable plates 10 and 13 may be provided with convenient means for determining with precision the relative angular adjustment of the same. These means may conveniently be in the form of the customary registering, graduated scales 14 and 15 provided thereon at their adjoining arcuate edges.

In adapting the protractor for use as an element of a marking compass, I propose in the first place to provide means for pivoting the protractor on the drawing paper. This may be accomplished by mounting a vertically slidable pin 16 in a bearing 17 at the axis of oscillation of the protractor plate 10 within the plate 13. The pin 16 has its lower end pointed as at 18 for engagement with the drawing paper like the pivoting point of any well known type of compass when forced in a downward direction. The pin may be provided at its upper end with a manipulating head 19 for use in depressing the pivot pin manually. I desire to have the pivot pin supported yieldably in inoperative position with its point clear of the paper at all times when not in active use. A helical compression spring 20 interposed between the manipulating head 19 and the upper surface of the protractor plate 10 will efficiently serve this purpose. Some other form of spring or yieldable member may be used without departing from my invention.

The present drawings show the protractor to be composed of flat plates which are substantially co-planar, thereby permitting the instrument to bear evenly against the paper and occupy minimum space. This renders it difficult to observe the point of the pivoting device so I propose to provide means by which the pivoting point may be brought into accurate registration with any desired point on the drawing paper as an axis of rotation without its being necessary to view the point. I have devised a method of doing this which is practical and simple. By providing the plate 10 with apertures 21 disposed 90° apart around the pivotal axis and then inscribing centering marks 22 on the upper surface of the plate 10 so as to intersect the apertures 21 and the pivotal axis, I find that this object may be accomplished. The centering marks are preferably in the form of short lines disposed as radii 90° apart. Before proceeding with the detailed description of the other essential elements of the compass attachment, the manner in which the protractor may be centered by use of the centering marks will be described. Assuming that a given point on the drawing paper is selected as the axis upon which it is desired to rotate the protractor, two radial lines are drawn through this point at right angles to each other and of sufficient length to be viewed through the apertures 21 in the protractor when the latter is superimposed upon this ruled area of the paper. By shifting the protractor until all of the centering marks 22 register exactly with the intersecting lines on the paper, the pivot point will be brought into precise registration with the point which has been selected as the center of a circle to be drawn.

The remaining elements of the compass attachment will now be described. I desire to connect a marking element with the protractor in such a manner that it may be adjusted with precision radially to a circle having as its center the pivoting point. In order that considerable latitude as to the size of circle to be drawn may be afforded in this instrument, I have found it convenient to extend a portion of the protractor plate 10 radially in the form of an arm 24. The length of this arm should be such that circles of various sizes falling within the usual scope may be drawn by setting the marking element at predetermined points on the arm. It is often necessary to describe circles of large radius so the instrument may be rendered capable of drawing such circles by mounting an extension member 25 slidably on the arm proper 24. It is obvious that the construction of the arm 24 and its extension member and also the manner of connecting the two slidably together may be varied in practice. I have simply illustrated in the drawings one embodiment of the invention. I have provided the extension member with a dove-tailed groove 26 in which the arm 24 fits for rectilinear, telescopic adjustment. While the frictional contact of the arm with its extension member might be sufficient to secure the latter effectively in adjusted position on the arm, additional securing means may be provided in the form of a set screw 27, or other suitable device. This set screw is preferably located at the inner end of the extension member in order to permit maximum extension of the compass arm. By the term "compass arm" I include the arm proper 24 and its extension member 25.

The marking element of the compass is carried by the compass arm and for the sake of convenience is mounted directly on the extension member 25. In order that the marking element may be adjustable radially with respect to the pivotal axis of the protractor, it may include in its construction a supporting member 28 which is in the form of a vertical post having a foot 29 slidably fitting within a longitudinal dove-tailed groove 30 in the upper surface of the extension member. Means are provided for securing the supporting member in adjusted position upon the arm extension, consisting preferably in the knurled clamping nut 31 which is threaded onto the supporting member for engagement with the upper surface of the arm extension member 25. The marking element also includes in its construction a horizontal arm 32 which may be secured to the supporting member 28 by means of the binding screw 33. This arm preferably extends laterally from the compass arm and thus at a tangent with respect to the pivotal axis of the protractor. The arm 32 overlies and projects past the edge 34 of the arm extension member 25. This edge of the extension member is disposed on a radial line intersecting the pivotal axis of the protractor for a purpose which will be described more fully hereinafter. Arm 32 has a longitudinal dove-tailed groove 35 in its upper surface opening through the end thereof opposite to the supporting member 28 and is provided further with a longitudinal slot 36 in communication with the groove. The outer end of the slot 36 has an enlarged portion 37. A slide 38 has a foot 39 slidably fitted within the dove-tailed groove 35, whereby the slide is mounted for rectilinear sliding movement lengthwise on the arm 32. A holder 40 for a pencil or other marking implement is mounted for vertical reciprocation within a bearing opening 41 in the slide. In order to prevent rotary movement of the holder in this slide, the former may be provided with a squared portion 42 fitting a correspondingly shaped portion 43 of the bearing opening. The holder is cylindrical in form just below the squared portion and has a reduced portion 44 of such diameter that it will fit slidably within the slot 36 in arm 32 when the holder is adjusted vertically to a given position. The portion of the holder located between the portion 44 and portion 42 is of such diameter that it will fit snugly within the enlarged end 37 of slot 36 when the holder is depressed into its operative position wherein the pencil carried thereby will be in contact with the drawing paper. The intermediate portion of the holder just mentioned is too large to enter the main portion of slot 36 so serves to lock the slide 38 in its operative position at the outer end of groove 35. Means for yieldably supporting the holder 40 in its elevated inoperative position may consist of the helical compression spring 45, which may conveniently be interposed between the upper end of slide 38 and a knurled manipulating head 46 provided at the upper end of the holder. When the pencil holder is in inoperative position, the reduced portion 44 thereof will register with the slot 36 and thus permit horizontal adjustment of the slide along arm 32. Such adjustment is desirable in order to bring the pencil point into closer proximity to the adjacent edge 34 of the arm extension member 25 for a purpose which will now be described.

A scale of linear measurement is delineated upon the upper surface of the arm extension member 25 along the edge 34 and may be graduated in terms of inches and fractions thereof, or according to any other desired system of measurement. The scale reads outward from the inner end of the extension member and is constructed with reference to two starting points, as they may be termed. One starting point or zero is the pivotal axis of the protractor. The other is a line 36′ inscribed on the upper surface of arm 24 adjacent to the outer end of the latter (shown dotted in Figures 1 and 2). It will be observed upon reference to Figures 1 and 2 that the scale has two sets of readings. One reads from 1 inch to 8, and the other reads from 9 to 16. The first reading is used when the arm extension member is secured in its innermost position with its shoulder 37′ abutting the limiting shoulder 38′ on the protractor plate 10. In this position, the first inch division of the scale marked "1" will be exactly one inch from the pivotal axis of the protractor. The line 36′ on the arm 24 in this particular instance is located precisely eight and one-quarter inches from the pivotal axis of the protractor. Therefore, when the extension member 25 is released and moved outward along the arm 24 until its shoulder 37′ registers with the line 36′, the first inch division on the scale will be nine inches from the pivotal axis as indicated by the second reading of the scale. It should be apparent, with this in view, that the pencil or other marking implement may be adjusted along the scale at any desired distance from the pivotal axis regardless of the particular position of the extension member 25 by using the appropriate set of readings.

The advantage of having the slide 38 which bears the pencil holder adjustable horizontally should now be apparent. By bringing the pencil point close to the reading scale it is easy to adjust the same accurately at the desired radial distance from the pivot. When the marking pencil has been adjusted to draw a circle of predetermined radius, the slide may be shifted outward along the arm 32 until the pencil point is clear of the scale, whereupon the holder may be depressed against the action of the spring 45 until the pencil point reaches its operative position in contact with the drawing paper.

The marking element may be adjusted roughly by grasping the manipulating head 46 manually and pushing the element along the compass arm. In order, however, to afford means for obtaining minute adjustment of the marking element with accuracy and precision, a micrometer screw may be provided. A simple micrometer adjustment is illustrated in the present drawings. In this instance, an adjustable member 47 is disposed adjacent to the supporting member 28 of the marking element and has a foot 48 fitting slidably within the groove 30 in the arm extension member 25. This adjustable member 47 may be secured firmly in adjusted position by means of a clamping nut 49 which is threaded onto the said member and is adapted to engage the upper surface of the arm extension member when tightened. A micrometer screw 50 constructed on the order of a turn-buckle extends between the members 28 and 47 and has oppositely threaded extremities fitting within threaded apertures 51 and 52, respectively, in members 28 and 47. The screw has a knurled manipulating wheel or flange 53 centrally disposed thereon.

The marking element is first adjusted roughly in the manner previously described. Then the clamping nut 49 is tightened so as to fix the adjustable member 47 on the compass arm and, by turning the manipulating wheel 53 of the micrometer screw, the member 28 and the marking element supported thereby will be adjusted with greater precision. Minute adjustments are effected in this way. It is to be understood, of course, that the clamping nut 31 should be loosened before the marking element is adjusted along the compass arm in any manner. After the adjustment has been completed, the marking element should be secured in adjusted position by tightening clamping nut 31. This will obviate the danger of accidental displacement of the marking element which might result from unintentional contact with the micrometer screw while leaning over the instrument in use.

The use of my combination protractor and compass is as follows: Assuming that it is desired to use the device as a protractor only, the pivoting pin and pencil holder of the marking element are permitted to remain in their elevated inoperative position wherein they will not interfere with the use of the protractor. By holding the protractor plate 13 in any desired angular position on the drawing sheet and then oscillating the plate 10 through the desired angle, as determined by reference to the scales 14 and 15, the compass arm may be brought into position for use as a straight-edge. In this use of the compass arm, a marking implement may be drawn along one edge of the arm, or the marking element of the compass attachment might be released and slid along the arm for this purpose, in which case the pencil holder should be depressed until the marking point contacts with the paper.

When it is desired to draw a circle or an arc of a circle of any given radius, this may be done with my combination instrument. The marking element is first adjusted at the desired distance from the pivot pin and is secured in adjusted position. Then the pivot pin is centered at the desired location on the drawing sheet in the manner previously described. Now the pivot pin may be depressed into proper engagement with the paper and drawing board by the use of one hand, while the other is used to depress the pencil holder of the marking element and swing the whole instrument as a compass around the pivot pin as an axis.

While I have disclosed in the accompanying drawings and described in the specification one practical embodiment of my invention, I do not necessarily limit myself to this particular form. Various modifications may be made in the details of construction without departing from the scope of the invention. It is to be understood also that the component parts of the instrument may be made of any suitable material, depending upon the requirements of manufacture and commercial use of the instrument.

I claim:

1. In a drafting instrument, a protractor, a pivot for the protractor, a marking implement and a marking implement holder slidable radially on the protractor and carrying the marking implement for adjustment tangentially with respect to a circle having the protractor pivot axis as its center.

2. In a drafting instrument, a protractor, a pivot for the protractor, an arm projecting from the protractor and having one of its side edges forming a straight-edge extending radially with respect to the pivotal axis of the protractor, and a marking element movable along such straight-edge.

3. In a drafting instrument, a protractor, means for pivoting the protractor, an arm projecting from the protractor radially with respect to its pivot, an extension member adjustably mounted on the said arm, and a marking element adjustably mounted on the extension member, said arm and extension member having means for indicating the degree of adjustment of the marking element relative to the protractor pivot.

4. In a drafting instrument, a protractor, means for pivoting the protractor, an arm projecting from the protractor radially with respect to its pivot, an elongated extension member slidably connected with the said arm for longitudinal adjustment and having a scale of linear measurement thereon, the said arm being provided with a mark adapted to register with the scale on the extension member, and a marking element adjustably mounted on the extension member and adapted to traverse the scale.

5. In a drafting instrument, a protractor, means for pivoting the protractor, an arm projecting from the protractor radially with respect to its pivot, an elongated extension member slidably connected with the said arm for longitudinal adjustment thereon and having a scale of linear measurement thereon, the protractor arm being provided with a mark adapted to register with the scale on the extension member, means for securing the extension member in adjusted position on the arm, and a marking element adjustably mounted on the extension member and adapted to traverse the scale.

6. In a drafting instrument, a protractor, means for pivoting the protractor, a compass arm projecting from the protractor radially with respect to its pivot and having a longitudinal scale of linear measurement thereon, and a marking element mounted on the compass arm and including a longitudinally adjustable member and a laterally adjustable holder for a marking implement adapted in one position to overlie the scale.

7. In a drafting instrument, a protractor, means for pivoting the protractor, a compass arm projecting from the protractor radially with respect to its pivot and having a longitudinal scale of linear measurement thereon, a marking element carried by the compass arm and including an adjustable member mounted for longitudinal movement thereon and a holder for a marking implement laterally adjustable with respect to the arm and adapted in one position to overlie the scale, and means for securing the holder in a second adjusted position at one side of the arm.

8. In a drafting instrument, a protractor, means for pivoting the protractor, a compass arm projecting from the protractor radially with respect to its pivot and having a longitudinal scale of linear measurement thereon, a marking element carried by the compass arm and including an adjustable member mounted for longitudinal movement thereon and a holder for a marking implement laterally adjustable with respect to the arm and adapted in one position to overlie the scale, means for securing the holder in a second adjusted position at one side of the arm, and means for adjusting the adjustable member of the marking element.

9. In a drafting instrument, a protractor, means for pivoting the protractor, a compass arm projecting from the protractor radially with respect to its pivot and having a longitudinal scale of linear measurement thereon, a marking element carried by the compass arm and including an adjustable member mounted for longitudinal movement thereon and a holder for a marking implement laterally adjustable with respect to the arm and adapted in one position to overlie the scale, means for securing the holder in a second adjusted position at one side of the arm, means for adjusting the adjustable member of the marking element, and means for securing the said adjustable member in adjusted position on the compass arm.

10. In a drafting instrument, a protractor, a pivot for the protractor, the said protractor having apertures therein and centering marks at the edges of the apertures disposed on lines radiating from the pivotal axis, and a marking element connected to the protractor.

In testimony whereof I have affixed my signature.

ALONZO E. BELL.

Witness:
C. McDevitt.